Oct. 15, 1929.  B. C. WHITE  1,732,035

LEAK INDICATOR FOR PRESSURE LINES

Filed Nov. 25, 1927

INVENTOR.
Burt C. White

BY
Thos. Donnell
ATTORNEY.

Patented Oct. 15, 1929

1,732,035

UNITED STATES PATENT OFFICE

BURT C. WHITE, OF DETROIT, MICHIGAN

LEAK INDICATOR FOR PRESSURE LINES

Application filed November 25, 1927. Serial No. 235,448.

My invention relates to a new and useful improvement in a leak indicator for pressure lines adapted for use particularly on refrigerator plants and the like where ammonia is maintained in pipes under pressure.

The fire code of most cities requires that all ammonia lines have an outlet pipe leading to the atmosphere and preferably above the roof, so that in case of fire, the valve may be opened and the ammonia permitted to escape. These valves are also arranged to automatically open in case the pressure becomes excessive and frequently, after opening, either due to a higher pressure or some defect in the operation of the valve, they fail to close tightly, with the result that a considerable amount of ammonia is constantly leaking from the lines. This leakage of ammonia involves considerable expense, and it is an object of the present invention to avoid such a situation.

Another object of the invention is the provision of a device whereby leakage of fluid in the pressure lines therefrom may be easily and quickly ascertained.

Another object of the invention is the provision of a double indicator adapted for connecting to a pressure line to indicate whether or not leakage is occurring from said pressure line.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Figure 1:
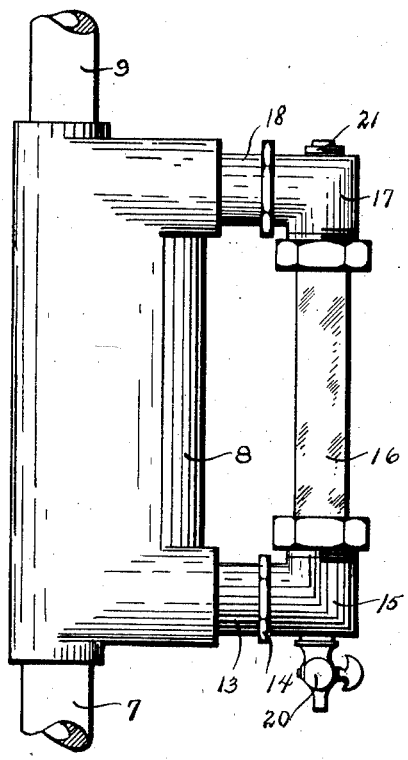
Figure 2:
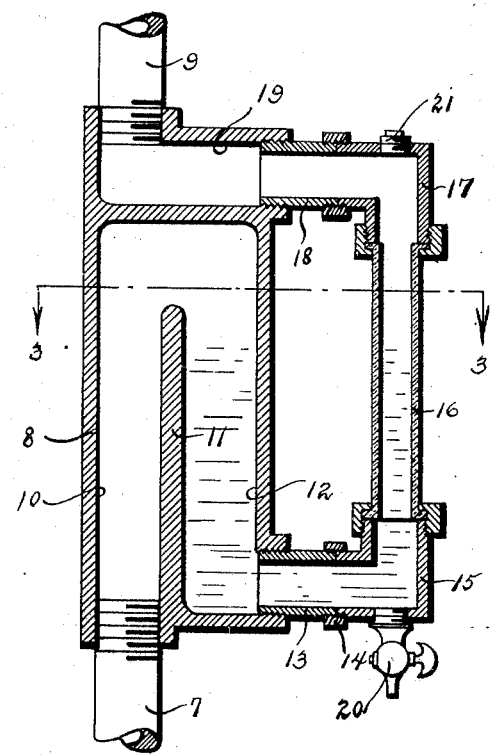
Fig. 2 is a central vertical sectional view of the invention.
Figure 3:
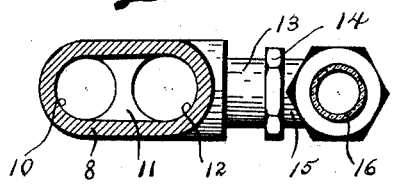
Fig. 3 is a view taken on line 3—3 of Fig. 2.
Figure 4:
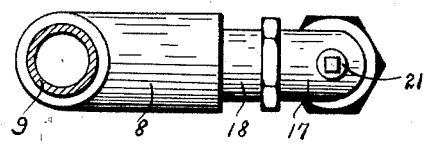
Fig. 4 is a top plan view of the invention.

Safe operation of a plant in which ammonia and similar fluids are maintained in a pressure line suggests the presence and use of an outlet pipe to conduct the fluid in the pressure lines exterior of the building or to a safe location, in case of emergency.

In the drawings I have shown the outlet pipe 7 threaded into a housing 8, and another outlet pipe 9 threaded into the housing 8, so that the housing 8 may be said to be interposed in this outlet or relief pipe. This housing has a chamber 10 separated by the partition 11 from the chamber 12. A nipple 13 is threaded into an outlet port formed in the base of the chamber 12 and connected to the nipple 13 by a suitable coupling 14 and an L 15, secured to which, in communication therewith, is a transparent tube 16, the upper end of which is secured in communication with an L 17 connected to a nipple 18 communicating with the passage 19 which is in communication with the outlet pipe 9. A pet cock 20 is positioned in the L 15 for draining purposes and a plug 21 is positioned in the L 17 for cleaning, inspection or other purposes.

In operation, after the housing has been interposed in the outlet pipe, as indicated, through the opening closed by the plug 21, a liquid, such as a suitable oil, is poured into the glass tube 16 until this liquid has risen to a suitable level in the tube 16, so that it may be readily visible upon inspection. It is evident that the level of the liquid in the tube 16 will also be maintained in the chamber 12. Should the relief valve be leaking the gas or other fluid under pressure would travel through the pipe 7 into the chamber 10, and thus downwardly through the liquid in the chamber 12 and upwardly through the liquid in the tube 16, so that when it is a gas that is escaping, the succession of bubbles in the tube 16 would be visible. Consequently, the occasional inspection of the tube 16 would indicate whether or not there was a slow leak by the presence or absence of the bubbles in the glass 16.

Should the relief valve constantly open so that the gas under pressure in the pressure line would be permitted to escape through the pipes 7 and 9, under their normal pressure and in a large volume, the liquid in the compartment 12 and in the tube 16 would be blown outwardly through the pipe 9, so that a subsequent inspection of the glass 16 would indicate that the relief valve had been opened widely. In such instance, a replenishing of the oil or other liquid would be necessary in order that the indication desired might be effected.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A pressure line leak indicator of the class described, comprising: a housing; a partition in said housing dividing the same into a pair of passages communicating with each other adjacent their upper ends, one of said passages being adapted for communication at its lower end with the pressure line; a transparent liquid container positioned in proximity to and exterior of said housing and communicating adjacent its lower end with said housing through an opening formed adjacent the lower end of the other passage, and communicating at its upper end with said pressure line so that gas flowing through said pressure line is directed into said housing and through said liquid container.

2. A device of the class described, comprising: a housing; a longitudinally extending partition in said housing dividing said housing into a pair of chambers communicating with each other adjacent their upper ends, the lower end of one of said chambers having an inlet opening, and the lower end of the other chamber having an outlet opening; and a transparent liquid container communicating adjacent its lower end with said outlet opening.

3. A device of the class described, comprising: a housing; a longitudinally extending partition in said housing dividing said housing into a pair of chambers communicating with each other adjacent their upper ends, the lower end of one of said chambers having an inlet opening, and the lower end of the other chamber having an outlet opening; and a transparent liquid container communicating adjacent its lower end with said outlet opening, said housing having a transversely extending passage formed adjacent its upper end communicating with the upper end of said liquid container.

4. A pressure line leak indicator of the class described, comprising: a housing; a partition in said housing dividing the same into a pair of passages communicating with each other adjacent the upper ends, said housing having a transversely extending passage formed adjacent its upper end and opened exterior of said housing at the side thereof, one of said passages in said housing opening adjacent its lower end through the side of said housing and the other of said passages in said housing communicating with the pressure line, said transversely extending passage communicating with the pressure line; and a transparent container exterior of said housing communicating with said openings, said partition extending from the base of said housing to adjacent the top thereof.

In testimony whereof I have signed the foregoing specification.

BURT C. WHITE.